United States Patent [19]

Mazz

[11] Patent Number: 4,626,632
[45] Date of Patent: Dec. 2, 1986

[54] MAINTENANCE TERMINATION UNIT

[75] Inventor: Thomas Mazz, Huntington Station, N.Y.

[73] Assignee: Porta Systems Corp., Syosset, N.Y.

[21] Appl. No.: 760,055

[22] Filed: Jul. 25, 1985

[51] Int. Cl.⁴ .................. H04B 3/46; H03K 17/72
[52] U.S. Cl. ................................ 379/29; 307/252 B
[58] Field of Search .............. 179/175.3 R, 175.3 F, 179/175, 19, 81 R; 307/252 B, 318, 363

[56] References Cited

U.S. PATENT DOCUMENTS 4,052,624 10/1977 Hamstra ........................ 307/318 X
4,181,921 1/1980 Taylor et al. ............... 307/252 B X
4,485,271 11/1984 Norling et al. ......... 179/175.3 R X

*Primary Examiner*—Stafford D. Schreyer
*Attorney, Agent, or Firm*—Charles E. Temko

[57] ABSTRACT

An improved and simplified voltage sensitive switching unit for opening a telephone subscriber pair at the line of demarcation for purposes of conducting line tests of the pair from the telephone central office to determine the state of the line. Relatively complex prior art circuitry is replaced by a combination of inexpensive solid state devices which eliminates the need for a prior art combination of diode bridge and transistor switching network.

3 Claims, 1 Drawing Figure

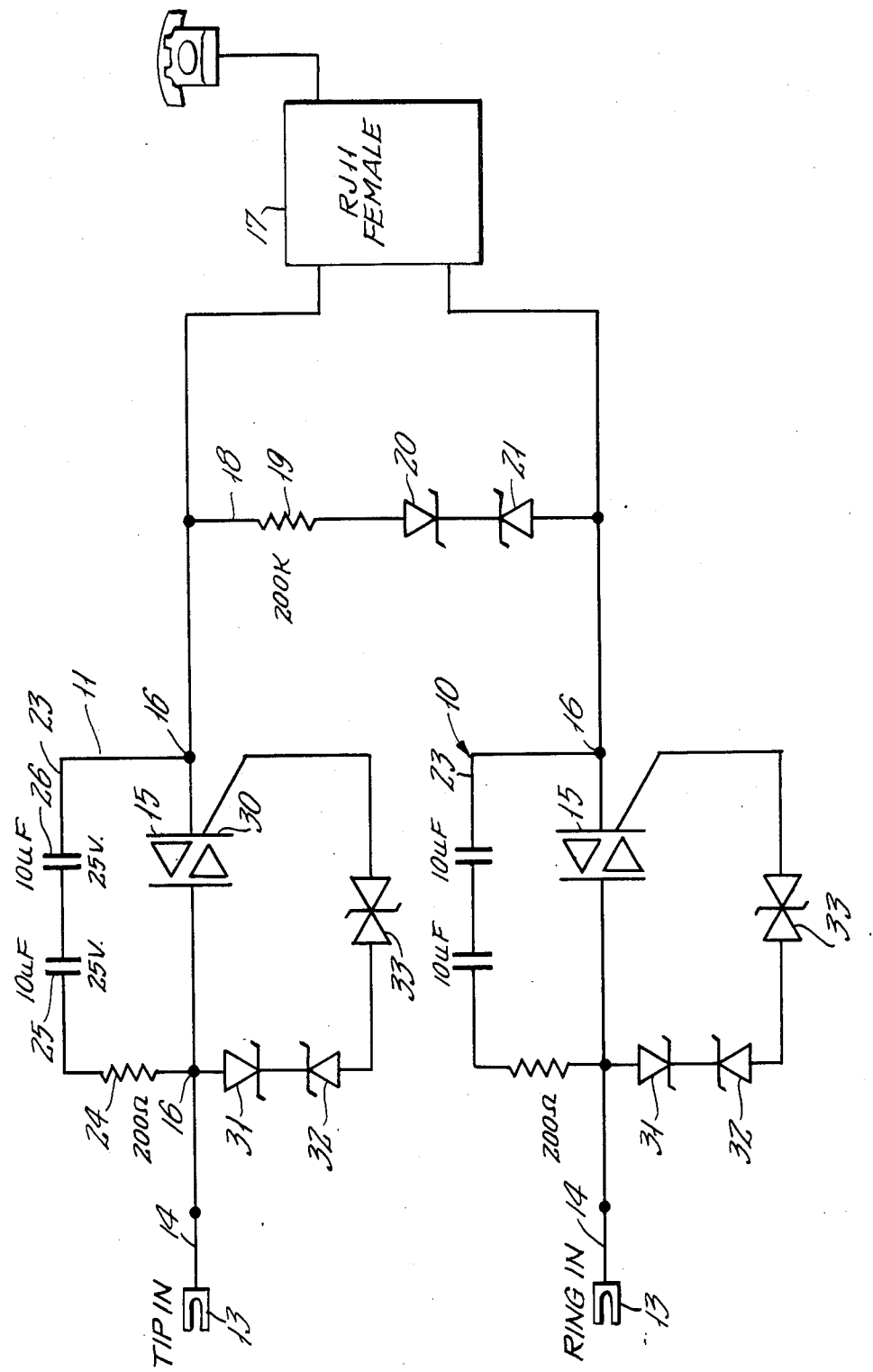

MAINTENANCE TERMINATION UNIT

BACKGROUND OF THE INVENTION

This invention relates generally to the field of telephony, and more particularly to an improved maintenance termination unit serving to open a subscriber circuit at the demarcation point, normally the point where subscriber equipment is connected, so that the central office can conduct necessary tests to determine the condition of that part of the line for which it is responsible. Devices of this general type are known in the art, and the invention lies in specific details of structure which permit both lower manufacturing costs, a smaller casing or housing, and, because of simplicity, improved reliability in operation.

Subscriber ownership of on-premises telephone equipment is now commonplace. With it, the problem for joint responsibility on the part of the telephone company and the subscriber for the maintenance of their respective sections of the subscriber line emanating from both sides of a demarcation point, usually the entrance terminal, arises. It is readily appreciated that the major portion of the line is the property and the responsibility of the telephone company, and as a practical matter, the subscriber performs little, if any, periodic tests of his equipment. The bulk of the tests initiated by the telephone company require the opening of the line to the subscriber, and the effective closing of a loop off the subscriber premises as a result of passage of predetermined voltages to a maintenance termination unit located at the demarcation point which includes a voltage responsive switch. Once actuated, subsequent tests are conducted at alternating current voltages compatible with the holding of the switch in open condition. When the tests are completed, the normal direct current voltage is restored, and the maintenance termination unit returns to normal condition resulting in re-establishment of communication with the subscriber-owned equipment.

Prior art structure for performing the above described functions has been relatively complicated and extensive, requiring the presence of a diode bridge and an integrated circuit having a Zener diode, several resistors and a pair of transistors. This unit requires a housing, the largest diameter of which is approximately four inches. Thus, the unit requires a substantial amount of space within the building entrance terminal.

SUMMARY OF THE INVENTION

Briefly stated, the invention contemplates the provision of an improved maintenance termination unit of simplified construction and circuitry in which the cost of manufacture and spacial requirements are substantially reduced without any sacrifice of reliability of operation. In lieu of the above described structure, the switching means has solid state structure comprising a series connection of a pair of opposed Zener diodes, one of which conducts at approximately one volt, the second at eight volts. The pair of diodes are in series with an SBS switch of eight volt sensitivity.

BRIEF DESCRIPTION OF THE DRAWING

In the drawing, the single FIGURE is a schematic wiring diagram of an embodiment of the invention.

DETAILED DESCRIPTION OF THE DISCLOSED EMBODIMENT

In accordance with the invention, and with reference to the drawing, the device, generally indicated by reference character 10 may be suitably enclosed within a casing (not shown) having first and second networks 11 and 12, which are connected to first and second sides of the line at terminals 13. Each side 14 of the subscriber pair includes a triac 15 interposed between a pair of shunt terminals 16 connected in parallel with the subscriber connection for his equipment, normally a wall jack 17 or similar terminal. The shunt path between the terminals 16, indicated by reference character 18, normally includes a 200K resistor 19 in series with a Zener diode 20 and a second diode 21 of opposite polarity. When the triac 15 is in non-conductive condition, alternating currents may be introduced on the line which pass through a shunt circuit 23 including a 200 ohm resistor 24, and a pair of 10 microfarad condensors 25 and 26 which permits conductivity of alternating currents during the performance of tests.

To permit these tests, it is essential that control of the triac 15 emanate from the telephone central office, and it is common to provide a control element, one side of which is connected to the subscriber line, and the other to the control terminal on the triac. In the prior art, this control element has included a diode bridge including two pairs of diodes in parallel, the bridge, in turn, being connected to an integrated circuit including a Zener diode, several resistors, and a pair of transistors. This structure is normally of such size as to require a casing at least four inches long in its largest dimension, which requires a corresponding space within the building entrance terminal, the location of the normal line of demarcation of responsibility between the subscriber and the telephone company.

In lieu of this construction, the present invention contemplates the provision of a relatively simple circuit comprising a control element 30 which includes in series a first Zener diode 31 which is conductive at one volt, a second Zener diode 32 of opposed polarity and conductive at approximately nine volts, as well as an SBS switch of eight volt sensitivity which enables the element 30 to be conductive in the presence of either AC or DC voltage in excess of 18 volts. Thus, the preparation of the subscriber circuit for the conducting of tests from the telephone central office with the subscriber equipment "on hook" requires the introduction of an alternating current in excess of eighteen volts which results in placing the triac 15 in non-conductive mode. Alternating current in excess of eighteen volts is then impressed upon the line which travels through the shunt path 18 and shunt 23 to the other side of the line which is similarly activated.

When the tests have been completed, the alternating current voltage is interrupted, and normal direct current is again connected to the subscriber pair. In this condition, the triacs are again conductive, so that upon the subscriber equipment going "off hook", normal communication is established.

It should be noted that the entire cost of the diodes 31 and 32 as well as the SBS switch 33, all of these elements being commercially produced in high volume, is very low, and since they occupy little physical space, it is possible to house same in a casing (not shown) only one and one-half inches long and one-half inch thick, the entire unit being readily replaceable at very low cost should it become, at any time, inoperative.

I wish it to be understood that I do not consider the invention to be limited to the precise details of structure shown and set forth in this specification, for obvious modifications will occur to those skilled in the art to which the invention pertains.

I claim:

1. In a telephone maintenance termination unit for forming a closed circuit loop in a subscriber pair at a subscriber demarcation point, the unit including at least one triac, the opening of which permits conductivity only of alternating currents, improved means for placing said triac in a non-conductive mode including a series connection from one of said pair to a control element of said triac, said connection including a first Zener diode of first polarity, a second Zener diode of opposed polarity, and an SBS switch.

2. The improvement in accordance with claim 1, further characterized in said series connection being conductive in a range above approximately eighteen volts.

3. The improvement in accordance with claim 1, further characterized in the provision of a pair of triacs, one for each side of the subscriber circuit, each triac having a series connection of first and second Zener diodes and an SBS switch for controlling a respective triac.

* * * * *